(12) United States Patent
Ichida

(10) Patent No.: US 6,290,621 B1
(45) Date of Patent: Sep. 18, 2001

(54) DERAILLEUR FOR A BICYCLE

(75) Inventor: Tadashi Ichida, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/291,965

(22) Filed: Apr. 15, 1999

(51) Int. Cl.$^7$ .............................. F16H 9/00; F16B 39/00
(52) U.S. Cl. ................. 474/80; 474/82; 411/169
(58) Field of Search .................. 474/80, 82, 81, 474/79, 67, 70; 411/169, 973, 386, 522, 517, 521, 523, 524; 403/337

(56) References Cited

U.S. PATENT DOCUMENTS

| | | | |
|---|---|---|---|
| 3,974,707 | * | 8/1976 | Nagano .................................. 474/82 |
| 4,226,132 | * | 10/1980 | Nagano et al. ........................ 474/82 |
| 4,507,101 | * | 3/1985 | Nagano .................................. 474/82 |
| 5,052,891 | * | 10/1991 | Burkholder ...................... 403/337 X |
| 5,380,252 | * | 1/1995 | Iwasaki et al. .................... 474/82 X |
| 5,417,530 | * | 5/1995 | Grossner ........................... 411/523 X |
| 5,704,100 | * | 1/1998 | Swan ................................. 411/522 X |
| 5,794,462 | * | 8/1998 | Steele et al. ........................... 70/18 |

FOREIGN PATENT DOCUMENTS 2506251   11/1982   (FR) .

* cited by examiner

*Primary Examiner*—David A. Bucci
*Assistant Examiner*—Marcus Charles
(74) *Attorney, Agent, or Firm*—Shinjyu Global IP Counselors, LLP (57) ABSTRACT

Derailleurs are provided on bicycles to move or shift a chain between two or more sprockets for changing gears. Most multi-geared bicycles have front and rear derailleurs. The front and rear derailleurs are connected to shift operating devices via shift cables to shift gears. Each derailleurs has a fixed member adapted to be coupled to a portion of the bicycle, a chain guiding member for shifting the chain of the bicycle and a linkage assembly coupled between the fixed member and the chain guiding member. Link or pivot pins are used to couple the links of the linkage assembly to the fixed member and the chain guiding member. These link or pivot pins are removably and non-rotatably coupled to the fixed member and/or the chain guiding member. Preferably, the link or pivot pins have a head portion with an abutment surface and a shaft portion with a conically tapered free end and an annular groove for receiving a retaining clip.

30 Claims, 8 Drawing Sheets

DERAILLEUR FOR A BICYCLE

BACKGROUND OF THE INVENTION

1. Field of the Invention

This invention generally relates to a derailleur for a bicycle. More specifically, the present invention relates a derailleur for a bicycle that can be easily disassembled for replacing the parallel links.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the drive train of the bicycle.

Most of today's bicycles are multi-speed bicycles that allow the rider to select the appropriate gear ratio to suit the particular riding conditions encountered during the bicycle ride. One of the most popular types of gearing assemblies for multi-speed bicycles utilize a chain extending between a set of front sprockets mounted for rotation with the pedals and a set of rear sprockets mounted on the rear hub of the rear bicycle wheel for rotation therewith. A front derailleur is used to move the chain between the front sprockets or gears. Generally, most derailleurs (front or rear derailleurs) include a fixed member nonmovably secured to a bicycle frame, and a movable chain guiding member supported for movement relative to the fixed member. The chain guiding member has a pair of guide plates that forms a chain receiving slot for contacting and moving a chain between the sprockets. In the case of a rear derailleur, sprockets are rotatably mounted between the guide plates.

Normally, the front derailleur is designed to hold the chain on the inner sprocket, i.e., the sprocket closest to the center of the bicycle. The rear derailleur, on the other hand, is normally arranged to position the chain on the outermost sprocket in its rest position. In other words, when the rider operates the shift operating device of the front derailleur shifting mechanism, the operating conduit or cable pulls the front derailleur such that the chain is moved outwardly from one gear or sprocket to the next gear or sprocket, or releases the front derailleur such that the chain is moved inwardly from one gear or sprocket to the next gear or sprocket. When the rider operates the shift operating device of the rear derailleur shifting mechanism, the operating conduit or cable pulls the rear derailleur such that it moves the chain inwardly from one gear or sprocket to the next inner gear or sprocket, or releases the rear derailleur such that it moves the chain outwardly from one gear or sprocket to the next gear or sprocket. In other words, when the shift operating devices are moved to release the derailleur, the front derailleur will move inwardly towards the center of the bicycle, while the rear derailleur will move outwardly away from the center of the bicycle.

The front and rear derailleurs are constantly being redesigned to operate more efficiently and to improve the design such that they can be made lighter. Accordingly, derailleurs are typically constructed of lightweight materials and are made as thin as possible. Of course, this can result in the parts wearing out at a faster rate. Therefore, it is desirable to reduce wear in the more expensive parts of the derailleur or the more difficult parts to remove. Moreover, it is desirable to design the derailleur such that parts can be easily removed for cleaning and/or replacement.

In view of the above, there exists a need for a derailleur for a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a derailleur for a bicycle that can be easily assembled and/or disassembled for replacing the parallel links.

Another object of the present invention is to provide a derailleur for a bicycle that reduces the amount of wear occurring on either the fixed member or the chain guiding (movable) member.

The foregoing objects can basically be attained by providing a rear derailleur for a bicycle comprising a fixed member, a chain guiding member and a linkage assembly. The fixed member is adapted to be coupled to a portion of the bicycle. The chain guiding member shifts a chain of the bicycle in a transverse direction. The linkage assembly is coupled between the fixed member and the chain guiding member to move the chain guide between a retracted position and an extended position. The linkage assembly includes pivot pins coupling the fixed member and the chain guiding member thereto. At least one of the pivot pins is removably and non-rotatably coupled to one of the fixed member or the chain guiding member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
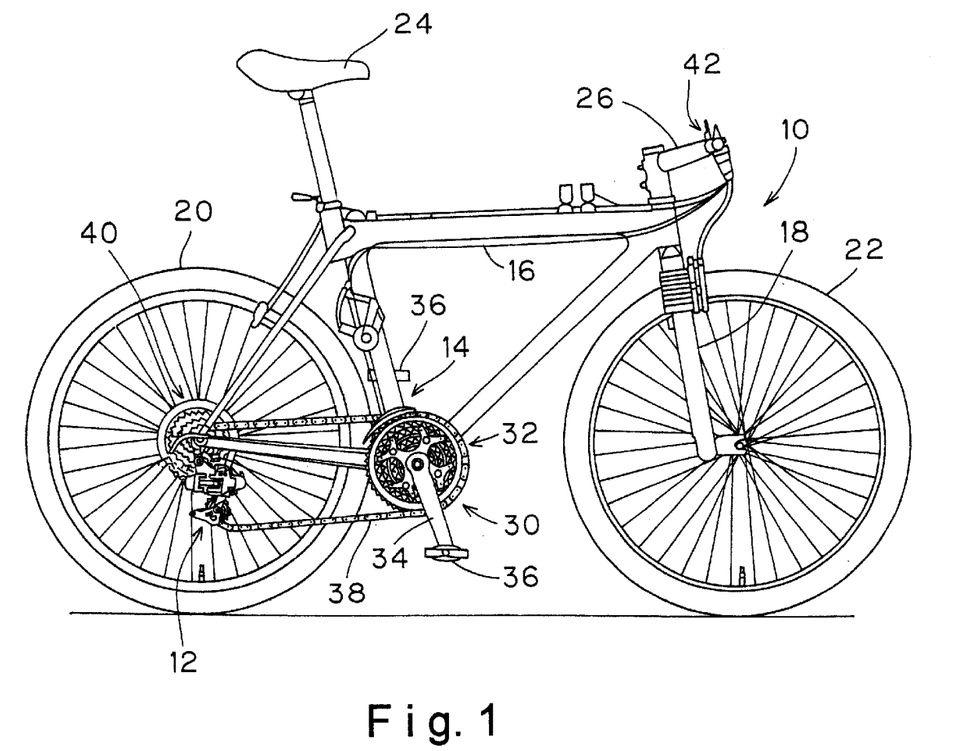
FIG. 1 is a side elevational view of a conventional bicycle with a rear derailleur coupled thereto in accordance with one embodiment of the present invention.

Referring initially to FIG. 1, a bicycle 10 is illustrated with derailleurs 12 and 14 in accordance with the present invention installed thereon as discussed below. Bicycle 10 and its various components are well known in the prior art, except that derailleurs 12 and 14 have been modified as explained below. Thus, bicycle 10 and its various components will not be discussed or illustrated in detail herein, except for the components that relate to the present invention.

As used herein, the following directional terms "forward, rearward, upward, above, downward, vertical, horizontal, below and transverse" as well as any other similar directional terms refer to those directions of a bicycle in its normal riding position, which derailleurs 12 and 14 are attached. Accordingly, these terms, as utilized to describe the derailleurs 12 and 14 in the claims, should be interpreted relative to bicycle 10 in its normal riding position.

Basically, bicycle 10 has a frame 16 with a front fork 18 movably coupled thereto, a rear wheel 20 rotatably coupled to frame 16, a front wheel 22 rotatably coupled to frame 16, a seat 24 adjustably coupled to frame 16, a handlebar 26 coupled to front fork 18 for turning front wheel 22 and a drive train 30 for propelling bicycle 10. Drive train 30 basically includes derailleurs 12 and 14, a front crank set 32 rotatably coupled to frame 16 via a bottom bracket (not shown), a pair of crank arms 34 with pedals 36, a drive chain 38 and a freewheel assembly 40 coupled to rear wheel 20 in a conventional manner. Since these parts of bicycle 10 are well known in the art, these parts will not be discussed or illustrated in detail herein, except as they are modified in accordance with the present invention.

Figure 2:
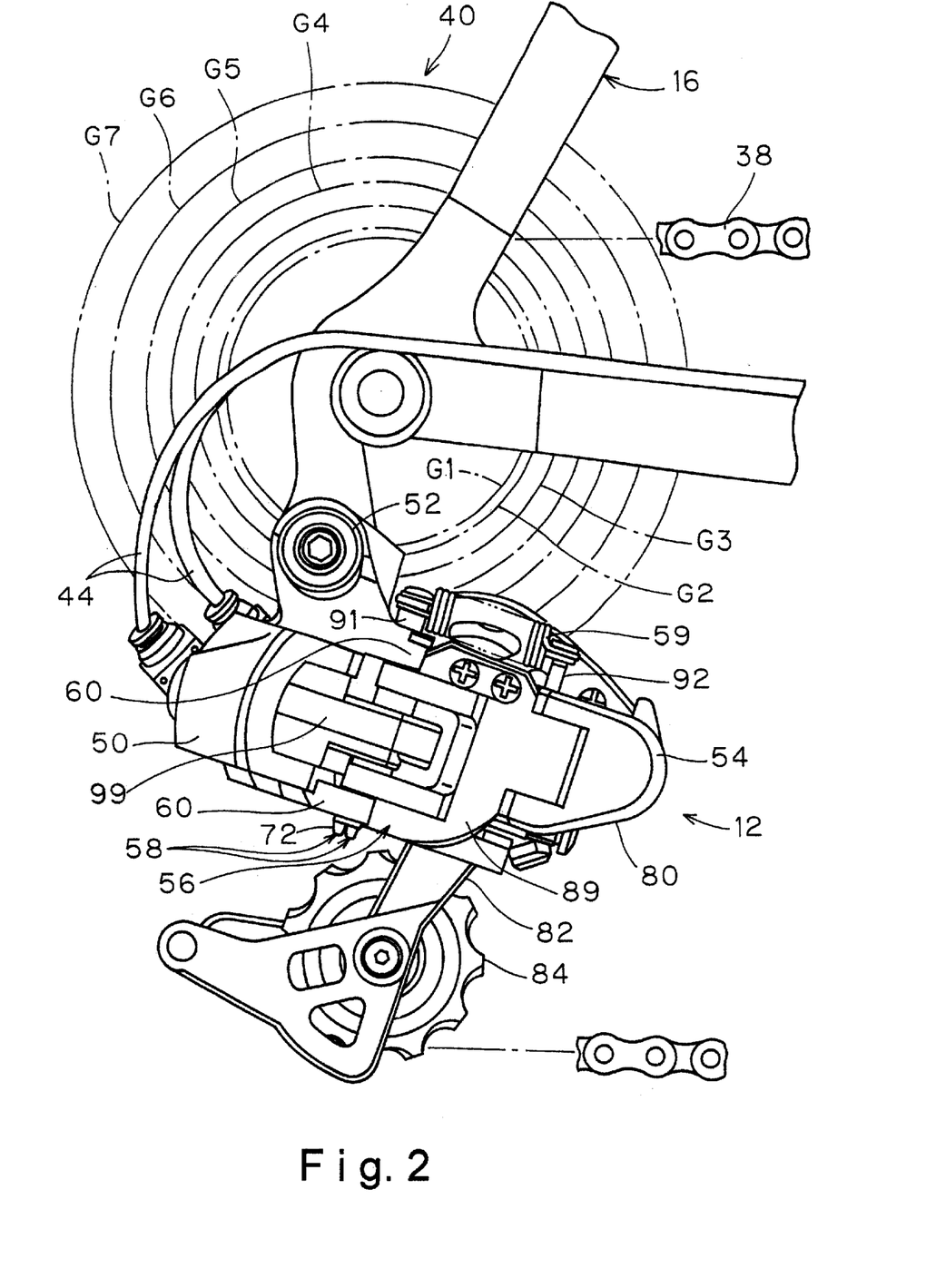
FIG. 2 is a partial side elevational view of the bicycle illustrated in FIG. 1 with the rear derailleur in accordance with the present invention mounted on the frame of the bicycle.

Referring now to FIG. 2, rear derailleur 12 in accordance with the present invention is illustrated as being coupled to frame 16 of a bicycle 10 (only a portion illustrated in FIG. 2). Rear derailleur 12, as illustrated in the drawings, is a pneumatically operated derailleur, such as the one disclosed in co-pending U.S. patent application Ser. No. 08/846,265 for gas actuated transmission for a bicycle which was filed with the U.S. Patent and Trademark Office on Apr. 29, 1997. The disclosure of patent application Ser. No. 08/846,265 is incorporated herein by reference to fully explain the operation and structure of rear derailleur 12.

More specifically, rear derailleur 12 is illustrated as being coupled to the rear fork end of frame 16 of a bicycle 10 for cooperating with freewheel assembly 40 in a conventional manner. While freewheel assembly 40 is illustrated with seven rear gears G1–G7, it will become apparent to those skilled in the art from this disclosure that freewheel assembly 40 can have fewer or more gears as needed and/or desired. Chain 38 is operatively coupled to rear gears G1–G7 and to front gears of crank set 32 in a conventional manner for transmitting the desired rotational torque to the rear wheel 20 of the bicycle 10.

Rear derailleur 12 is coupled to a rear shifting unit 42 (FIG. 1) via a pair of air tubes or conduits 44 in a conventional manner. Conduits 44 provide a shifting force to rear derailleur 12 for moving chain 38 between gears G1–G7. When the rider moves the shift unit 42, air from the conduits 44 either pulls rear derailleur 12 to move chain 38 inwardly to engage the next gear or releases rear derailleur 12 to move chain 38 outwardly to engage the next gear. In other words, chain 38 is either moved inwardly towards the center plane of bicycle 10 to engage the next larger gear or sprocket, or moved outwardly away from the center plane of bicycle 10 to engage the next smaller gear or sprocket. Rear derailleur 12 is designed to be normally biased outwardly such that chain 38 is normally positioned on the outermost gear G1.

While rear derailleur 12 is disclosed as being pneumatically operated by shifting unit 42, it will be apparent to those skilled in the art from this disclosure that the present invention can be applied to other types of derailleurs such as a cable operated derailleur. Since the basic structure and operation of rear derailleur 12 are well known in the art, only the parts of rear derailleur 12 that relate to the present invention will be discussed and illustrated herein. Moreover, shifting unit 42 can be practically any type of shifting unit. Therefore, the precise structure of shifting unit 42 will not be discussed or illustrated in detail herein.

As seen in FIG. 2, rear derailleur 12 basically includes a fixed member 50 with a bracket axle assembly 52, a chain guiding member 54, a linkage assembly 56, and a biasing member 59. Chain guiding member 54 is movably coupled to fixed member 50 via a linkage assembly 56. Biasing member 59 is preferably in the form of a coil tension spring that urges chain guiding member 54 outwardly from the center plane of the bicycle 10.

Fixed member 50 is fixedly coupled to frame 16 of the bicycle 10 by bracket axle assembly 52 in a conventional manner. Since bracket axle assemblies are well known in the bicycle art, the structure of bracket axle assembly 52 will not be discussed or illustrated in detail herein. While bracket axle assembly 52 is illustrated as being coupled directly to frame 16, it will be apparent to those skilled in the art from this disclosure that a removable derailleur hanger or hanging plate (not shown) can be utilized to connect bracket axle assembly 52 of rear derailleur 12 to frame 16. These types of derailleur hangers (not shown) are well known in the art, and thus, will not be discussed or illustrated hereon.

Two pneumatic air tubes 44 are coupled to fixed member 50 in a conventional manner. Air tubes 44 apply a shifting force on linkage assembly 56 for shifting or moving chain guiding member 54 relative to fixed member. When linkage assembly 56 holds chain guiding member 54 in its extended position, chain guiding member 54 is located over the outermost sprocket G1, i.e., the furthest sprocket from the center plane of bicycle 10. Shifting unit 42 controls these movements of chain guiding member 54 and linkage assembly 56 by selectively applying air to rear derailleur 12. Specifically, when the rider operates shifting unit 42, air pressure moves linkage assembly 56 to pull or release chain guiding member 54 between its extended position and its retracted position.

Figure 3:
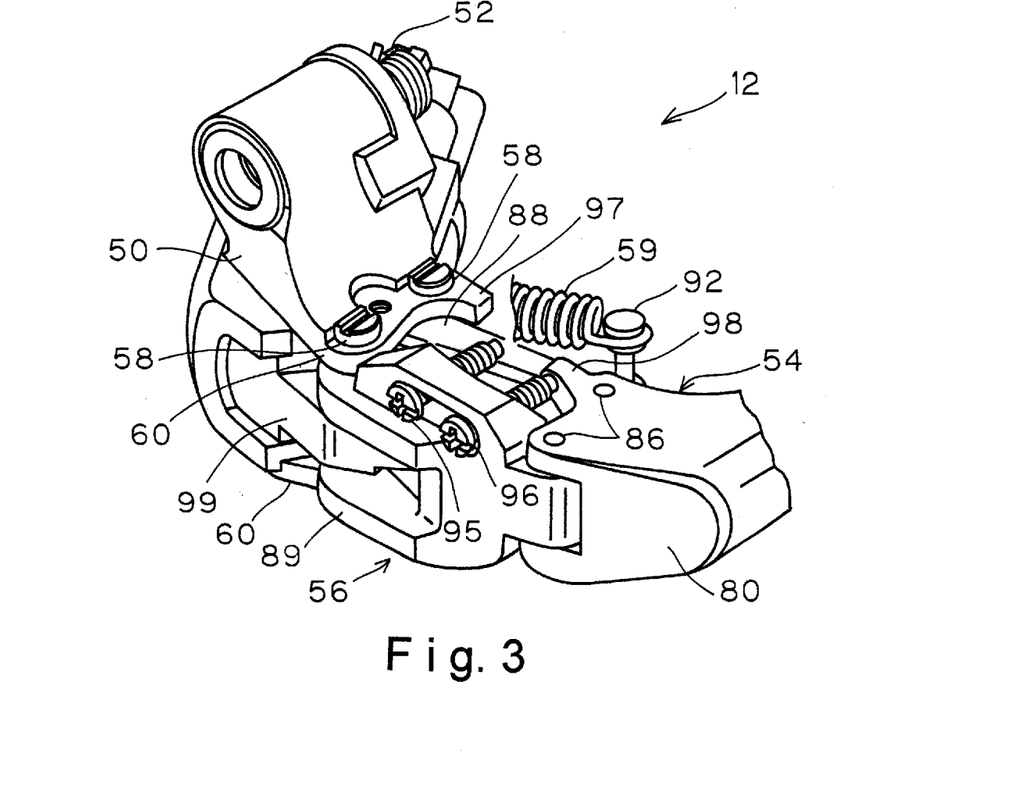
FIG. 3 is a partial perspective view of the rear derailleur illustrated in FIG. 2 in accordance with the present invention with certain portions broken away for the purposes of illustration.
Figure 4:
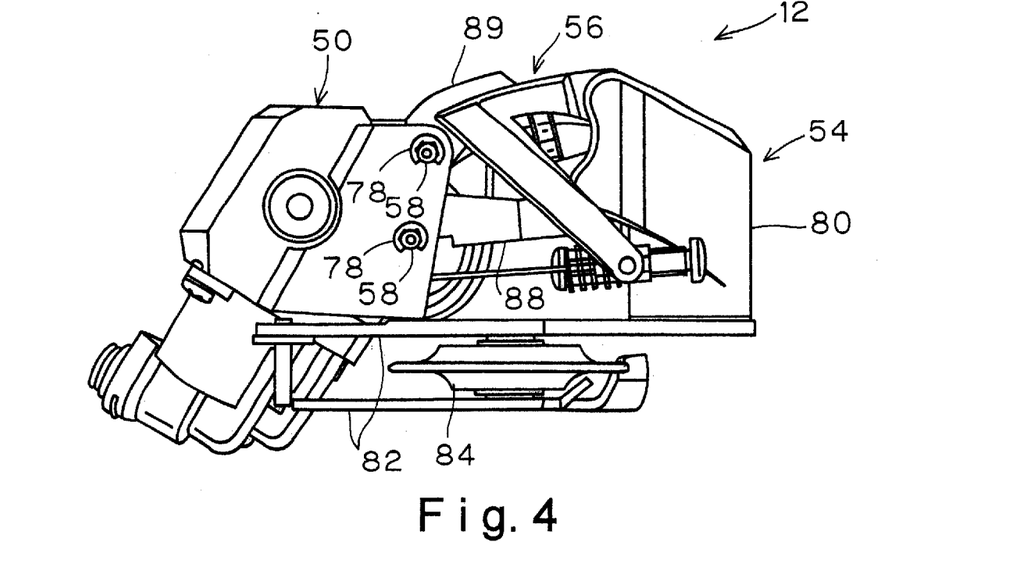
FIG. 4 is a bottom plan view of the rear derailleur illustrated in FIGS. 2 and 3 in accordance with the present invention.
Figure 5:
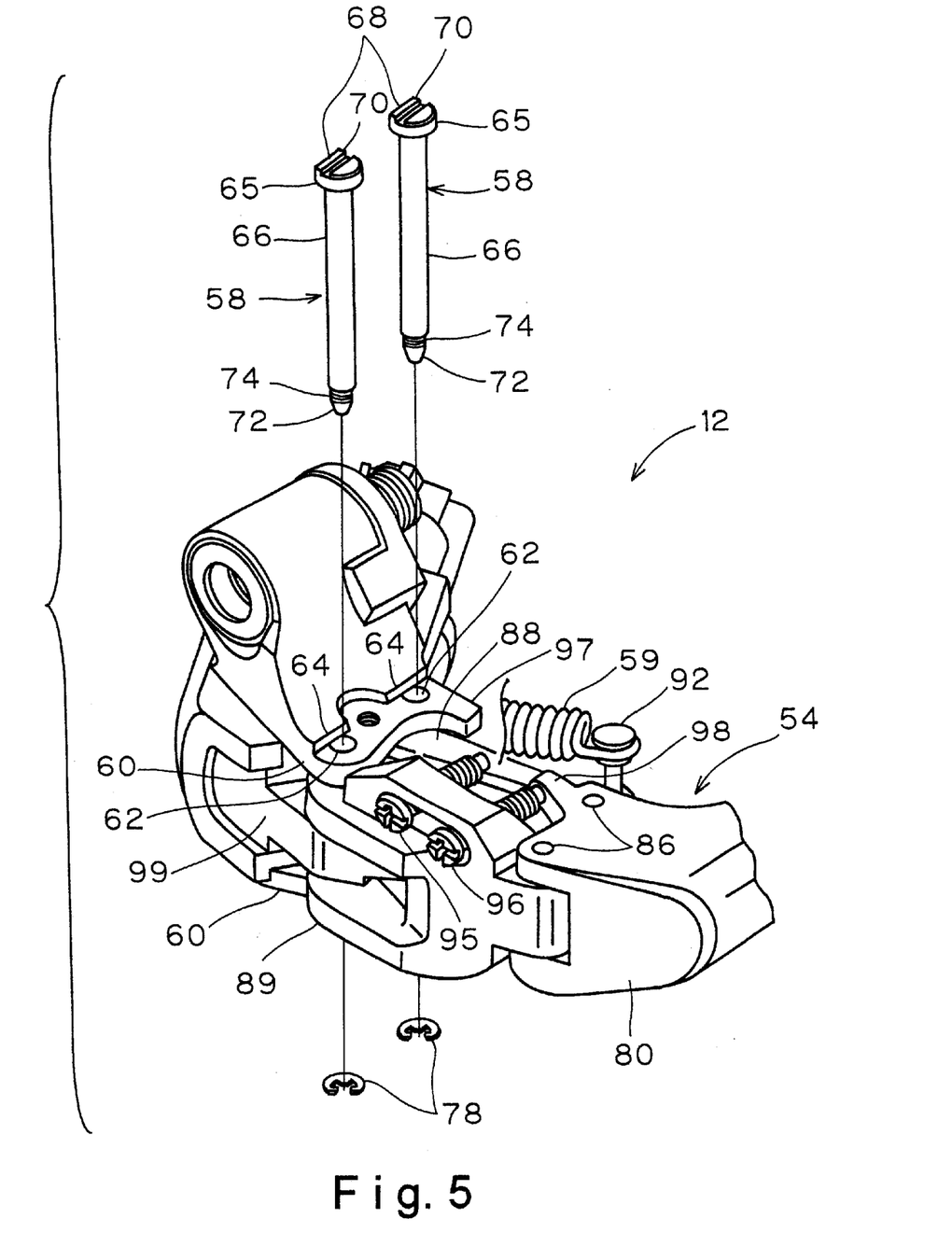
FIG. 5 is a partially exploded perspective view of a portion of the rear derailleur illustrated in FIGS. 2–4 in accordance with the present invention with certain portions broken away for the purposes of illustration.

As seen in FIGS. 3–5, fixed member 50 is coupled to linkage assembly 56 via a pair of pivot pins 58. Pivot pins 58 are designed so that they do not rotate relative to fixed member 50. Since pivot pins 58 do not rotate relative to fixed member 50, the amount of wear in fixed member 50 is minimized. Basically, fixed member 50 has a pair of vertically spaced flanges 60 that are parallel to each other. As seen in FIG. 5, each of these flanges 60 has a pair of holes 62 that are axially aligned with the holes 62 of the other flange 60. Each pair of axially aligned holes 62 receives one of the pivot pins 58 in a non-rotatably manner as discussed below.

As seen in FIGS. 3 and 5, the upper one of the flanges 60 has a pair of abutment surfaces 64 that engages pivot pins 58 to prevent relative movement. In other words, these abutment surfaces 64 are located adjacent the holes 62 in the upper flange 60 to engage the pivot pins 58 to prevent rotational movement of the pivot pins 58 relative to fixed member 50. Preferably, abutment surfaces 64 are flat surfaces or walls that extend upwardly from fixed member 50 in directions that are parallel to the longitudinal axes of holes 62. Of course, it will be apparent to those skilled in the art from this disclosure that other shapes of abutment surfaces can be utilized to carry out the present invention.

Pivot pins 58 each have a head portion 65 with a shaft portion 66 extending therefrom. Head portion 65 has a circumferential side surface with an abutment surface 68 formed thereon. Preferably, the abutment surface 68 of each head portion 65 is a flat surface that has a complimentary shape corresponding to the shape of abutment surface 64 of the fixed member 50. When pivot pins 58 are inserted into holes 62, abutment surfaces 64 of fixed member 50 mate with abutment surfaces 68 of pivot pins 58 to prevent relative movement therebetween. In other words, pivot pins 58 do not rotate within holes 62. Of course, other shapes for these abutment surfaces can be utilized if needed and/or desired to prevent rotation of pivot pins 58 within holes 62 of fixed member 50. Preferably, each head portion 65 is also provided with a slot 70 for receiving a tool such as a screwdriver for aiding in the assembly and disassembly of rear derailleur 12.

As seen in FIGS. 2 and 5, the free ends 72 of shaft portions 66 are preferably conically tapered to form a substantially pointed tip. The tapered free ends 72 of pivot pins 58 aid in the insertion of pivot pins 58 into holes 62 and the corresponding holes of linkage assembly 56. The shaft portion 66 of each pivot pin 58 is also provided with an annular groove 74 that is located adjacent to its free end 72. Grooves 74 are adapted to receive E-clips or other similar types of retaining clips 78. Retaining clips (retaining members) 78 non-threadedly engage pivot pins 58 to prevent longitudinal movement of pivot pins 58 and to removably couple pivot pins 58 to fixed member 50. Accordingly, pivot pins 58 can be easily installed and easily removed for attaching or detaching linkage assembly 56 and chain guiding member 54 from fixed member 50. In other words, the linkage assembly 56 and chain guiding member 54 can be easily removed and replaced when they become worn out.

Referring to FIGS. 2 and 4, chain guiding member 54 basically includes a movable member 80, a pair of guide plates 82 and a pair of sprockets 84 (only one shown). Movable member 80 is pivotally coupled to linkage assembly 56 via pivot pins 86. Guide plates 82 are rotatably coupled to movable member 80 in a conventional manner such that chain 38 is placed under tension by sprockets 84. Chain guiding member 54 has a chain receiving slot formed by guide plates 82 that are adapted to engage chain 38 for moving chain 38 in a direction transverse to bicycle 10. Sprockets 84 are rotatably coupled between guide plates 80 for engaging chain 38 in a conventional manner. Since chain guiding member 54 is relatively conventional, the additional parts of chain guiding member 54 will not be discussed or illustrated in detail herein.

Referring now to FIGS. 3–5, linkage assembly 56 basically includes an inner link 88 and outer link 89. Links 88 and 89 are provided with pivot holes (not shown) at each end for receiving pivot pins 58 and 86. More specifically, links 88 and 89 are pivotally coupled at one end to fixed member 50 by pivot pins 58. The other ends of links 88 and 89 are pivotally coupled to chain guiding members 54 by pivot pins 86. The biasing member 59 is coupled between the fixed member 50 by pin 91 and the inner link 88 of the linkage assembly 56 by pin 92. Spring 59 normally biases chain guiding member 54 outwardly away from the center of bicycle 10. Preferably, each of these components of linkage assembly 56 are constructed of relatively lightweight, rigid materials which are known in the art.

Biasing member 59 is preferably a coiled tension spring having a first end mounted on pivot pin 91 of fixed member 50 and a second end mounted on pin 92 of inner link 91 for normally biasing chain guiding member 54 from its extended position to its retracted position. In other words, biasing member or coil spring 59 expands and contracts in an axial direction, and is normally placed under tension to urge the cable guiding member 54 from its extended position to its retracted position. Of course, movement of chain guiding member 54 is controlled by shifting unit 42 which in turn activates a pneumatic shifting mechanism to supply pressurized air to rear derailleur 12 in a relatively conventional manner.

Outer link 89 has a pair of threaded holes for receiving adjustment screws 95 and 96 thereto. Adjustment screw 95 is a low gear position adjustment screw, while adjustment screw 96 is a high gear position adjustment screw. Adjustment screw 95 engages a portion of fixed member 50, while adjustment screw 96 engages a portion of chain guiding member 54 for controlling the range of movement of chain guiding member 54. In other words, by individually adjusting the axial extension of adjustment screws 95 and 96, the extended (low or larger gear) position and the retracted (high or smaller gear) position of chain guiding member 54 are adjusted independently of each other.

More specifically, as seen in FIGS. 3 and 5, fixed member 50 is provided with a low gear stopping surface 97, while chain guiding member 54 is provided with a high gear stopping surface 98 as best seen in FIG. 3. Low gear stopping surface 97 is designed to engage the free end of adjustment screw 95, while high gear stopping surface 98 is positioned to engage the free end of adjustment screw 96. Since this is a relatively conventional adjustment mechanism that is well known in the prior art, this adjustment mechanism will not be discussed or illustrated in detail herein.

An intermediate member 99 is coupled to fixed member 50 and includes an indexing mechanism contained therein for moving chain guiding member 54 in response to operation shifting unit 42. An example for an indexing mechanism which is contained within intermediate member 99 is disclosed in U.S. patent application Ser. No. 08/846,265. Accordingly, when the rider operates the pneumatic shifting unit 42, the intermediate member 99 will cause linkage assembly 56 to pivot inwardly against the biasing force of spring 59, which in turn moves the chain guiding member 54 attached thereto inwardly towards the center of the bicycle. This movement of chain guiding member 54 will also cause the chain 38 to move from an outer (smaller) gear to the next inner (larger) gear. Of course, if the shift operating mechanism is moved to allow the linkage assembly 56 to move under the biasing force of spring 59, the linkage assembly 56 will move chain guiding member 54 and chain 38 outwardly from a larger gear to the next smaller gear.

Second Embodiment

Figure 6:
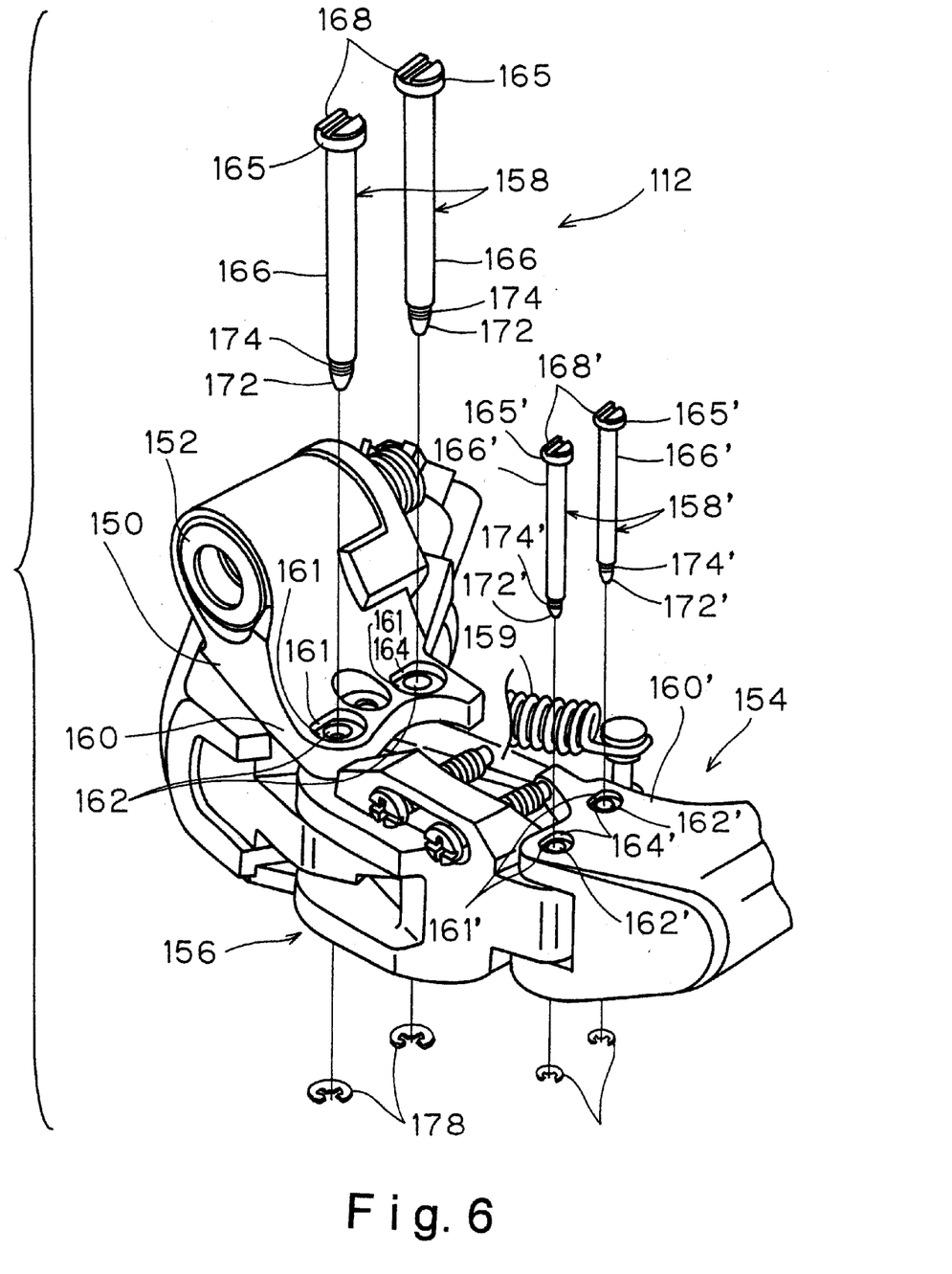
FIG. 6 is a partially exploded perspective view of a modified rear derailleur in accordance with an alternate embodiment of the present invention.
Figure 7:
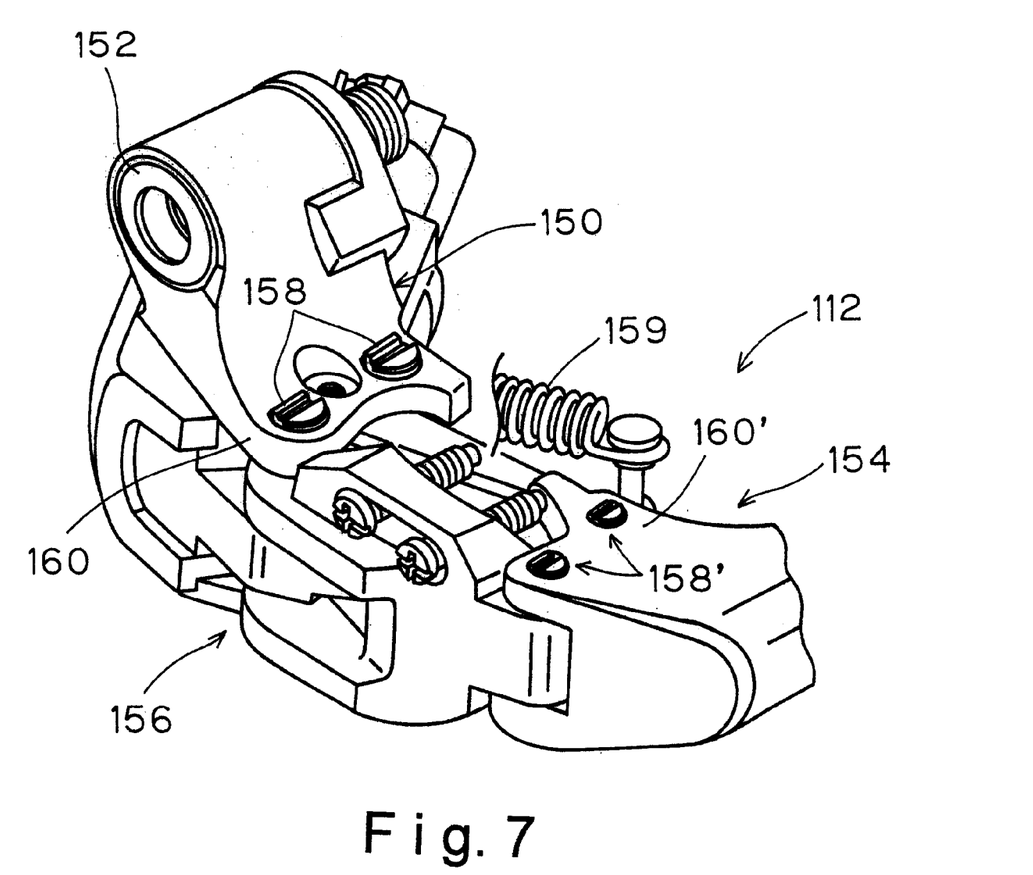
FIG. 7 is a partial perspective view of the rear derailleur illustrated in FIG. 6 with certain portions broken away for the purposes of illustration.

Referring now to FIGS. 6 and 7, a rear derailleur 112 is illustrated in accordance with another embodiment of the present invention. This embodiment is substantially identical to the first embodiment, except that the fixed member 150 and the chain guiding member 154 have been slightly modified. In view of the similarities between this embodiment and the prior embodiments, this embodiment will not be discussed or illustrated in as much detail as the first embodiment. Moreover, it will be apparent to those skilled in the art that the descriptions of the parts of the first embodiment applies to similar parts of this second embodiment.

Basically, rear derailleur 112 basically includes a fixed member 150 with a bracket axle assembly 152, a chain guiding member 154, a linkage assembly 156, and a biasing member 159. Chain guiding member 154 is movably coupled to fixed member 150 via a linkage assembly 156. Biasing member 159 is preferably in the form of a coil tension spring that urges chain guiding member 154 outwardly from the center plane of the bicycle 10.

Fixed member 150 is coupled to linkage assembly 156 via a pair of pivot pins 158. Similarly, chain guiding member 154 is also coupled to linkage assembly 158 via a pair of smaller pivot pins 158'. Pivot pins 158' are substantially identical to pivot pins 158, except that they are smaller in size. Pivot pins 158 are designed so that they will not rotate relative to fixed member 150, while pivot pins 158' are designed so that they will not rotate relative to chain guiding member 154. Since pivot pins 158 and 158' do not rotate relative to fixed member 150 or chain guiding member 154, respectively, the amount of wear in members 150 and 154 is minimized.

In this embodiment, the upper flange 160 of fixed member 150 is provided with a pair of recesses 161 that are coaxially formed about the holes 162. These recesses 161 are sized to receive the head portion 165 of the pivot pin 158. More specifically, these recesses 161 form abutment surfaces 164 that engage pivot pins 158 to prevent relative movement. Preferably, abutment surfaces 164 are flat surfaces or walls that extend upwardly from fixed member 150 in directions that are parallel to the longitudinal axes of holes 162. Of course, it will be apparent to those skilled in the art from this disclosure that other shapes of the abutment surfaces or recesses can be utilized to carry out the present invention.

Pivot pins 158 each have a head portion 165 with a shaft portion 166 extending therefrom. Head portion 165 has a circumferential side surface with an abutment surface 168 formed thereon. Preferably, the abutment surface 168 of each head portion 165 is a flat surface that has a complimentary shape corresponding to the shape of the abutment surface 164 of fixed member 150. When pivot pins 158 are inserted into holes 162, abutment surfaces 164 of fixed member 150 mate with abutment surfaces 168 of pivot pins 158 to prevent relative movement therebetween. In other words, pivot pins 158 do not rotate within holes 162. Moreover, the head portion 165 of each pivot pin 158 is recessed within fixed member 150 due to the recesses surrounding holes 162.

As seen in FIG. 6, the free end 172 of each shaft portion 166 is preferably conically tapered to form a substantially pointed tip or a truncated cone. The tapered free ends 172 of pins 158 aid in the insertion of pins 158 into holes 162 and the corresponding holes of linkage assembly 156. The shaft portion 166 of each pivot pin 158 is also provided with an annular groove 174 that is located adjacent its free end 172. Grooves 174 receive E-clips or other similar types of retaining clips 178. Thus, pivot pins 158 can be easily installed and/or easily removed for attaching or detaching linkage assembly 156 and chain guiding member 154 from fixed member 150.

In this embodiment, the upper flange 160' of chain guiding member 154 is provided with a pair of recesses 161' that are coaxially formed about the holes 162'. These recesses 161' are sized to receive the head portion 165' of the pivot pin 158'. More specifically, these recesses 161' form abutment surfaces 164' that engage pivot pins 158' to prevent relative movement. Preferably, abutment surfaces 164' are flat surfaces or walls that extend upwardly from chain guiding member 154 in directions that are parallel to the longitudinal axes of holes 162'. Of course, it will be apparent to those skilled in the art from this disclosure that other shapes of the abutment surfaces or recesses can be utilized to carry out the present invention.

Pivot pins 158' each have a head portion 165' with a shaft portion 166' extending therefrom. Head portion 165' has a circumferential side surface with an abutment surface 168' formed thereon. Preferably, the abutment surface 168 ' of each head portion 165' is a flat surface that has a complimentary shape corresponding to the shape of the abutment surface 164' of chain guiding member 154. When pivot pins 158' are inserted into holes 162', abutment surfaces 164' of chain guiding member 154 mate with abutment surfaces 168' of pivot pins 158' to prevent relative movement therebetween. In other words, pins 158' do not rotate within holes 162. Moreover, the head portion 165' of each pivot pin 158' is recessed within fixed member 150' due to the recesses surrounding holes 162'.

As seen in FIG. 6, the free end 172' of each shaft portion 166' is preferably conically tapered to form a substantially pointed tip or a truncated cone. The tapered free ends 172' of pins 158' aid in the insertion of pins 158' into holes 162' and the corresponding holes of linkage assembly 156'. The shaft portion 166' of each pivot pin 158 is also provided with an annular groove 174' that is located adjacent its free end 172'. Grooves 174' receive E-clips or other similar types of retaining clips 178'. Thus, pivot pins 158' can be easily installed and/or easily removed for attaching or detaching chain guiding member 154 from linkage assembly 156.

Third Embodiment

Figure 8:
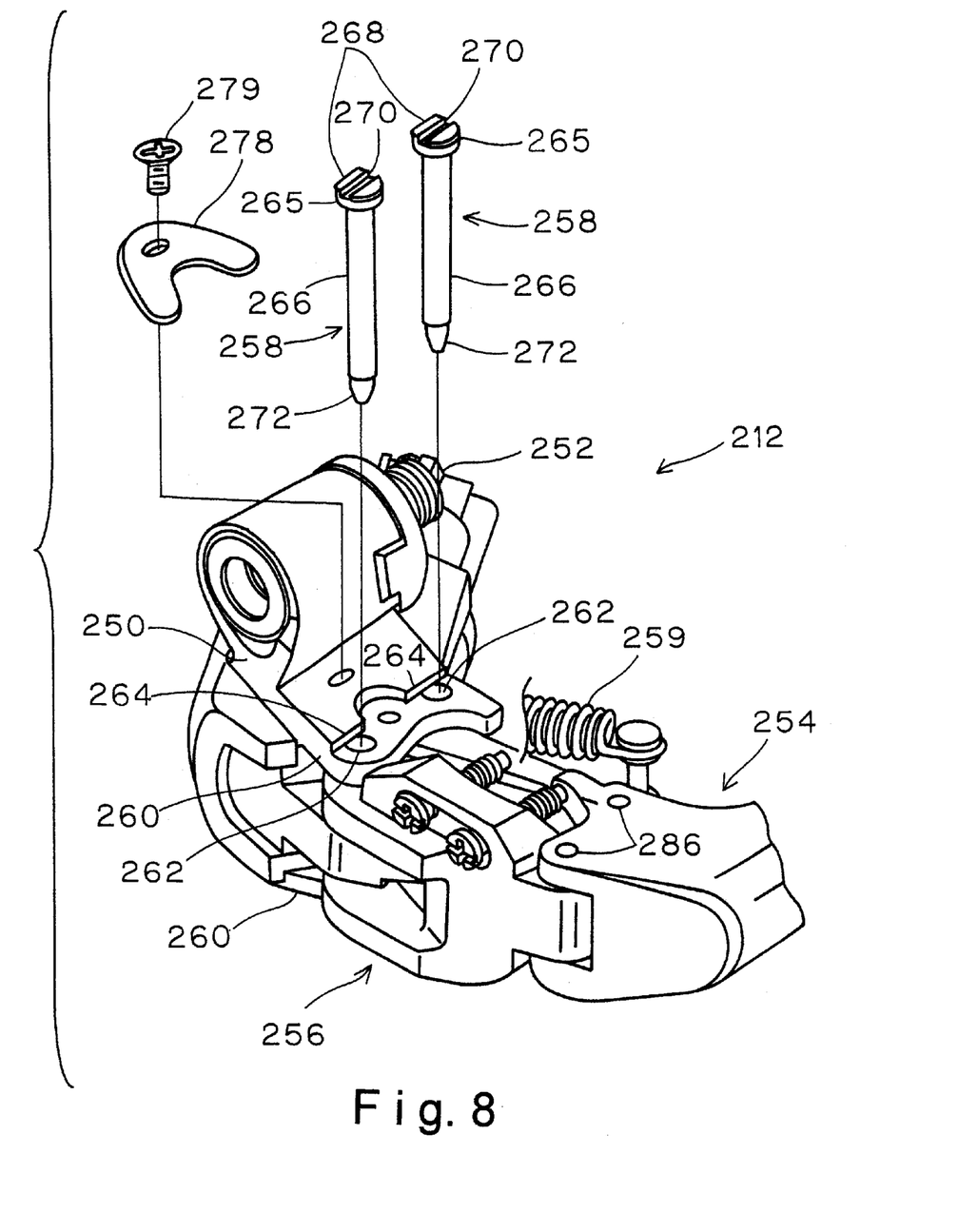
FIG. 8 is a partially exploded perspective view of a modified rear derailleur in accordance with an alternate embodiment of the present invention.
Figure 9:
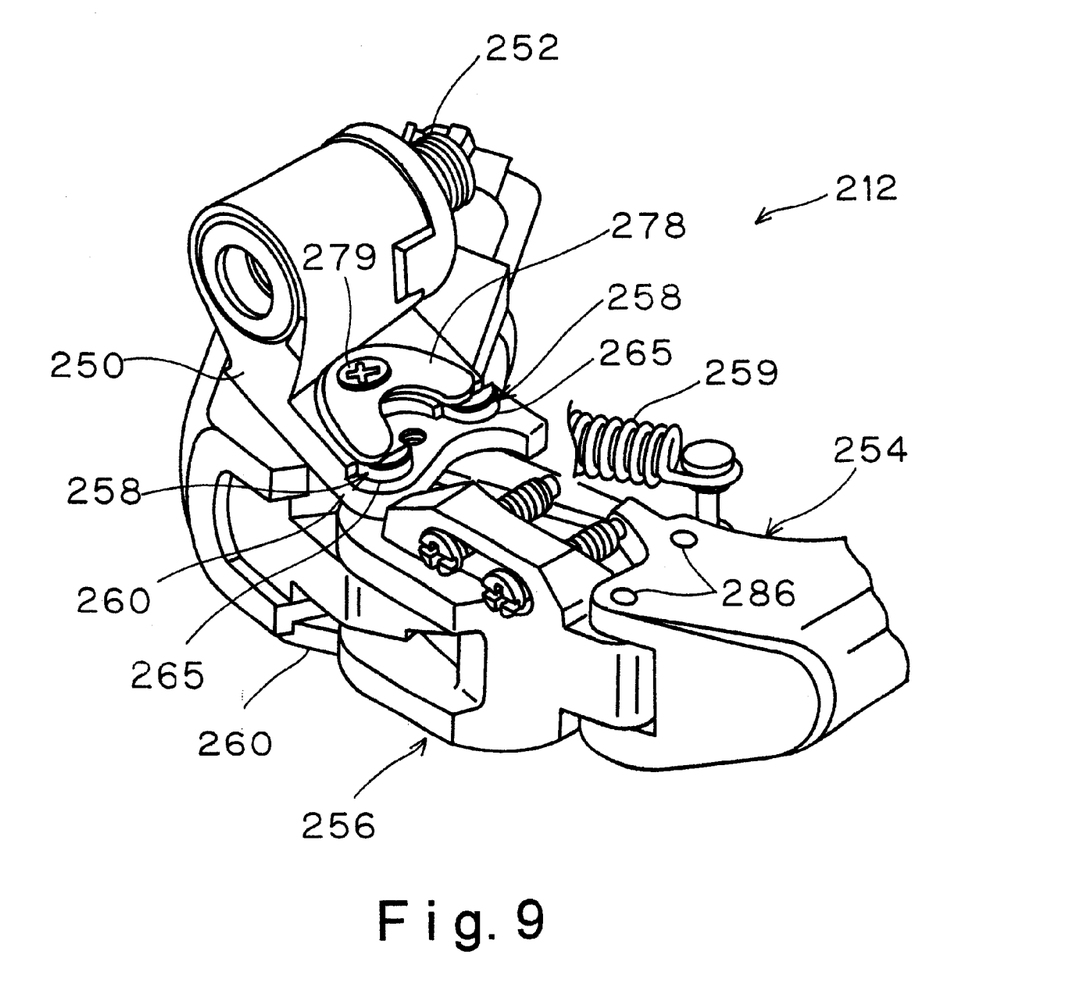
FIG. 9 is a partial perspective view of the rear derailleur illustrated in FIG. 8 with certain portions broken away for the purposes of illustration.

Referring now to FIGS. 8 and 9, a rear derailleur 212 is illustrated in accordance with another embodiment of the present invention. This embodiment is substantially identical to the first embodiment, except that a retaining plate 278 has been added to the fixed member 250 for retaining pivot pins 258 thereto. Accordingly, retaining clips 78 of the first embodiment have been eliminated as well as the grooves 74 of pins 58 of the first embodiment. In view of the similarities between this embodiment and the prior embodiments, this embodiment will not be discussed or illustrated in as much detail as the first embodiment. Moreover, it will be apparent to those skilled in the art that the descriptions of the parts of the first embodiment applies to similar parts of this third embodiment.

Basically, rear derailleur 212 basically includes a fixed member 250 with a bracket axle assembly 252, a chain guiding member 254, a linkage assembly 256, and a biasing member 259. Chain guiding member 254 is movably coupled to fixed member 250 via a linkage assembly 256. Biasing member 259 is preferably in the form of a coil tension spring that urges chain guiding member 254 outwardly from the center plane of the bicycle 10.

Fixed member 250 is coupled to linkage assembly 256 via a pair of pivot pins 258. Similarly, chain guiding member 254 is also coupled to linkage assembly 258 via a pair of pivot pins 286. Since pivot pins 258 do not rotate relative to fixed member 250, the amount of wear in fixed members 250 is minimized.

In this embodiment, the upper flange 260 of fixed member 250 has a pair of abutment surfaces 264 that engages pivot pins 258 to prevent relative movement. In other words, these abutment surfaces 264 are located adjacent the holes 262 in the upper flange 260 to engage the pivot pins 258 to prevent rotational movement of the pivot pins 258 relative to fixed member 250. Preferably, abutment surfaces 264 are flat surfaces or walls that extend upwardly from fixed member 250 in directions that are parallel to the longitudinal axes of holes 262. Of course, it will be apparent to those skilled in the art from this disclosure that other shapes of the abutment surfaces or recesses can be utilized to carry out the present invention.

Pivot pins 258 each have a head portion 265 with a shaft portion 266 extending therefrom. Head portion 265 has a circumferential side surface with an abutment surface 268 formed thereon. Preferably, the abutment surface 268 of each head portion 265 is a flat surface that has a complimentary shape corresponding to the shape of the abutment surface 264 of fixed member 250. When pivot pins 258 are inserted into holes 262, abutment surfaces 264 of fixed member 250 mate with abutment surfaces 268 of pivot pins 258 to prevent relative movement therebetween. In other words, pivot pins 258 do not rotate within holes 262. Moreover, the head portion 265 of each pivot pin 258 is recessed within fixed member 250 due to the recesses surrounding holes 262.

Retaining plate 278 is removably coupled to fixed member 250 via a bolt 279. Preferably, retaining plate 278 is constructed of a rigid, lightweight material such as a hard plastic material. In the preferred embodiment, the retaining plate 278 is a U-shaped member with end portions that engage the upper surface of head portions 265 of pivot pins 258 to retain pivot pins 258 within holes 262 of fixed member 250 as seen in FIG. 9. Thus, retaining plate (retaining member) 278 non-threadedly engages pivot pins 258 to prevent longitudinal movement of pivot pins 258 and to removably couple pivot pins 258 to fixed member 250.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A derailleur for a bicycle, comprising:
a fixed member adapted to be coupled to a portion of the bicycle;
a chain guiding member adapted to shift a chain of the bicycle in a transverse direction; and
a linkage assembly movably coupled between said fixed member and said chain guiding member to move said chain guiding member between a retracted position and an extended position, said linkage assembly including at least one first pivot pin coupling said fixed member thereto and at least one second pivot pin coupling said chain guiding member thereto,
at least one of said pivot pins being removably coupled to at least one of said fixed member and said chain guiding member, and having a head portion with a slot formed therein and a first abutment surface, said first abutment surfaced engaging a second abutment surface of at least one of said fixed member and said chain guiding member to prevent relative rotational movement therebetween.

2. A derailleur for a bicycle according to claim 1, wherein said chain guiding member includes at least one rotatably mounted sprocket coupled thereto.

3. A derailleur for a bicycle according to claim 1, wherein said first pivot pin is removably and non-rotatably coupled to said fixed member.

4. A derailleur for a bicycle according to claim 1, wherein said second pivot pin is removably and non-rotatably coupled to said chain guiding member.

5. A derailleur for a bicycle according to claim 1, wherein said linkage assembly is coupled to said fixed member by a pair of said first pivot pins that are removably and non-rotatably coupled to said fixed member.

6. A derailleur for a bicycle according to claim 1, wherein said linkage assembly is coupled to said chain guiding member by a pair of said second pivot pins that are removably and non-rotatably coupled to said chain guiding member.

7. A derailleur for a bicycle according to claim 1, wherein said first abutment surface is a substantially planar surface and said slot extends in a direction parallel to said first abutment surface.

8. A derailleur for a bicycle according to claim 1, wherein said at least one pivot pin with said slot is an unthreaded pivot pin.

9. A derailleur for a bicycle according to claim 3, wherein said first pivot pin has a conically tapered free end.

10. A derailleur for a bicycle according to claim 4, wherein said second pivot pin has a conically tapered free end.

11. A derailleur for a bicycle according to claim 5, wherein said linkage assembly includes a pair of links with first ends pivotally coupled to said fixed member by said first pivot pins and second ends pivotally coupled to said chain guiding member by a pair of said second pivot pins.

12. A derailleur for a bicycle according to claim 6, wherein said linkage assembly is coupled to said fixed member by a pair of said first pivot pins that are removably and non-rotatably coupled to said fixed member.

13. A derailleur for a bicycle according to claim 9, wherein said free end of said first pivot pin has a groove with a clip received therein.

14. A derailleur for a bicycle according to claim 10, wherein said free end of said second pivot pin has a groove with a clip received therein.

15. A derailleur for a bicycle according to claim 11, wherein each of said first pivot pins has said head portion with said first abutment surface and a shaft portion extending from said head portion to a free end, said fixed member includes a pair of said second abutment surfaces with said first abutment surfaces of said first pivot pins engaging corresponding said second abutment surfaces of said fixed member to prevent relative rotational movement therebetween.

16. A derailleur for a bicycle according to claim 12, wherein said linkage assembly includes a pair of links with first ends pivotally coupled to said fixed member by said first pivot pins and second ends pivotally coupled to said chain guiding member by said second pivot pins.

17. A derailleur for a bicycle according to claim 15, wherein said head portions of said first pivot pins have a non-circular circumference with said first abutment surfaces formed thereon.

18. A derailleur for a bicycle according to claim 15, wherein said first and second abutment surfaces are substantially planar surfaces.

19. A derailleur for a bicycle according to claim 15, wherein said fixed member has a pair of recesses forming said second abutment surfaces, said recesses being shaped to receive said head portions of said first pins therein.

20. A derailleur for a bicycle according to claim 15, wherein said chain guiding member includes at least one rotatably mounted sprocket coupled thereto.

21. A derailleur for a bicycle according to claim 15, wherein said free ends of said first pivot pins have conically tapered tips.

22. A derailleur for a bicycle according to claim 15, wherein said fixed member has a retaining plate coupled thereto with a portion of said retaining plate engaging said head portions of said first pivot pins.

23. A derailleur for a bicycle according to claim 21, wherein each of said free ends of said first pivot pins has a groove with a clip received therein.

24. A derailleur for a bicycle, comprising:

a fixed member adapted to be coupled to a portion of the bicycle;

a chain guiding member adapted to shift a chain of the bicycle in a transverse direction; and a linkage assembly movably coupled between said fixed member and said chain guiding member to move said chain guiding member between a retracted position and an extended position, said linkage assembly including at least one first pivot pin coupling said fixed member thereto and at least one second pivot pin coupling said chain guiding member thereto, at least one of said pivot pins being removably coupled to at least one of said fixed member and said chain guiding member, and having a head portion with a first abutment surface engaging a second abutment surface of at least one of said fixed member and said chain guiding member to prevent relative rotational movement therebetween, said first pivot pin being removably and non-rotatably coupled to said fixed member, said fixed member having a retaining plate coupled thereto with a portion of said retaining plate engaging said head portion.

25. A derailleur for a bicycle, comprising:

a fixed member adapted to be coupled to a portion of the bicycle;

a chain guiding member adapted to shift a chain of the bicycle in a transverse direction; and a linkage assembly movably coupled between said fixed member and said chain guiding member to move said chain guiding member between a retracted position and an extended position, said linkage assembly including at least one first pivot pin coupling said fixed member thereto and at least one second pivot pin coupling said chain guiding member thereto, at least one of said pivot pins being removably coupled to at least one of said fixed member and said chain guiding member, and having an enlarged head portion with a first contact surface and a first abutment surface transverse to said first contact surface, said first contact surface extending in a direction transverse to a center axis of said at least one of said pivot pins to prevent axial movement in one direction, said first abutment surface engaging a second abutment surface of at least one of said fixed member and said chain guiding member to prevent relative rotational movement therebetween.

26. A derailleur for a bicycle according to claim 25, wherein said enlarged head portion includes a slot formed therein.

27. A derailleur for a bicycle according to claim 26, wherein said first abutment surface is a substantially planar surface and said slot extends in a direction parallel to said first abutment surface.

28. A derailleur for a bicycle, comprising:

a fixed member adapted to be coupled to a portion of the bicycle;

a chain guiding member adapted to shift a chain of the bicycle in a transverse direction; and a linkage assembly movably coupled between said fixed member and said chain guiding member to move said chain guiding member between a retracted position and an extended position, said linkage assembly including at least one first pivot pin coupling said fixed member thereto and at least one second pivot pin coupling said chain guiding member thereto, at least one of said pivot pins being an unthreaded pivot pin removably coupled to at least one of said fixed member and said chain guiding member, and having a head portion with a first abutment surface engaging a second abutment surface of at least one of said fix member and said chain guiding member to prevent relative rotation therebetween, said at least one of said pivoting pins having a retaining member non-threadedly engaged with said unthreaded pivot pin to prevent longitudinal movement of said unthreaded pivot pin.

29. A derailleur for a bicycle according to claim 28, wherein said retaining member is a retaining clip received in a groove of said unthreaded pivot pin.

30. A derailleur for a bicycle according to claim 28, wherein said unthreaded pivot pin is removably and non-rotatably coupled to said fixed member, and said retaining member is a retaining plate coupled to said fixed member and engaging said head portion of unthreaded pivot pin.

* * * * *